Dec. 28, 1954   J. A. SMYSER   2,697,853

TIRE TREAD ALIGNER

Filed July 6, 1951

INVENTOR:
JAMES A. SMYSER
BY HIS ATTORNEYS
HARRIS, KIECH, FOSTER & HARRIS
By Ford W Lamir

United States Patent Office

2,697,853
Patented Dec. 28, 1954

2,697,853

TIRE TREAD ALIGNER

James A. Smyser, Taft, Calif.

Application July 6, 1951, Serial No. 235,464

2 Claims. (Cl. 18—18)

This invention relates to tire tread aligners and more particularly to a device adapted to be utilized to align the tread of a tire prior to the deposition of the tire in a mold for the recapping thereof by precisely aligning the beads of the tire with respect to each other so that the tread of the tire is retained in a predetermined position and configuration during the deposition of the tire in the mold.

When the tread of a tire is worn smooth, it is necessary, for reasons of safety and economy, to either discard the tire or to provide a new tread thereupon by recapping or retreading the smooth tire. One of the most difficult aspects of the recapping or retreading process is the alignment of the smooth tread of the tire with the recapping or retreading material in the clamshell, or other type mold, in which the tire is processed. Although this problem has always been present in the recapping industry, it has become even more serious with the advent upon the market of low pressure, thin walled tires. This is due to the fact that, when low pressure, thin walled tires are deposited in a recapping or retreading mold, and the mold closed thereupon, there is a tendency for the walls of the tire to shift in the mold, causing misalignment of the recapping or retreading material with the smooth tread of the tire.

It is, therefore, a primary object of my invention to provide a tire tread aligner which can be utilized in conjunction with a recapping or retreading mold to prevent the twisting of the tire within the mold and thus prevent the misalignment of the recapping or retreading stock with the smooth tread of the tire.

Prior art tread aligners have been adapted for use with only one size of tire and have been bulky and difficult to use. Furthermore, the use of prior art tire tread aligners has necessitated a considerable expenditure of time to install the tires thereupon and to remove them therefrom.

A further object of my invention is the provision of a tire tread aligner which is designed to accommodate tires having beads of different diameters and which can be readily and quickly installed upon and removed from tires.

Another object of my invention is the provision of a tire tread aligner which includes a support for said tire, a rim disposable in the interior of said tire for engagement with the inner edges of the beads thereof and connecting means for temporarily connecting the rim to a power source to cause relative axial movement between the rim and support.

A further object of my invention is the provision of a tire tread aligner of the aforementioned character in which the rim is provided with an expander adapted to cause the expansion of said rim against the beads of the tire subsequently to the axial movement of said rim with reference to said support.

Another object of my invention is the provision of a tire tread aligner of the aforementioned type in which the tire can be readily removed from the support by disconnecting the connecting means from the rim to permit the rim alone to be installed with the tire in the mold.

An additional object of my invention is the provision of a tire tread aligner of the aforementioned character in which the connecting means includes a rotatable element and the rim includes a plurality of projections adapted to be engaged by the rotatable element to provide a temporary connection between the rim and the support of the aligner.

An additional object of my invention is the provision of a tire tread aligner of the aforementioned type which includes automatic release means adapted, when the beads of the tire and the tread thereof have been properly aligned with respect to the rim of the aligner, to cause the automatic de-energization of the power source associated with the support to terminate relative axial movement between the rim and the support of the aligner.

A further object of my invention is the provision of a tire tread aligner which is so designed that the support can be utilized in conjunction with a plurality of rims so that one support can serve a large number of molds.

An additional object of my invention is the provision of a tire tread aligner in which the rim is of relatively light weight construction and which, since the rim is separable from the support, permits the rim to be carried to the mold with the tire deposited thereupon in properly aligned relationship therewith.

Other objects and advantages of my invention will be apparent from the following specification and the accompanying drawing, which is for the purpose of illustration only, and in which.

Figure 2:
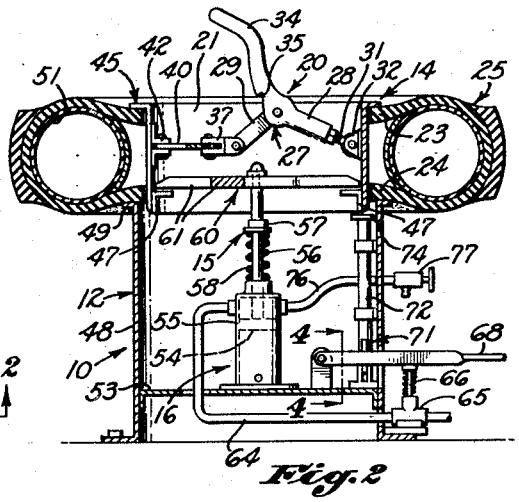
Fig. 2 is a vertical, partly sectional view taken on the broken line 2—2 of Fig. 1 showing a tire deposited on the tire tread aligner in unaligned position.

Referring to the drawing, and particularly to Fig. 2 thereof, I show a tire tread aligner 10 constructed in accordance with my invention and constituted generally by a support 12 of substantially cylindrical configuration, an annular rim 14, connecting means 15 and a motor 16 for energizing the connecting means to cause relative axial movement between the rim 14 and the support 12, in a manner to be described in greater detail below.

Figure 1:
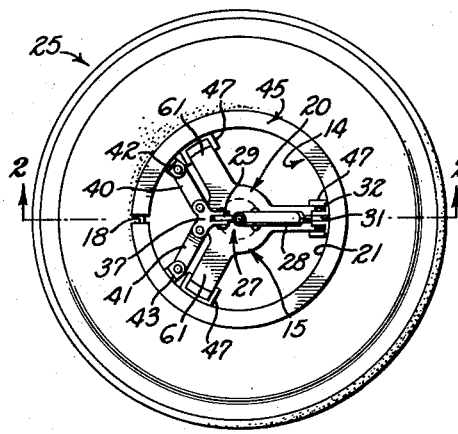
Fig. 1 is a plan view of a tire tread aligner constructed in accordance with my invention showing a tire mounted thereupon.

The rim 14 is split, as indicated at 18 in Fig. 1 of the drawing, and is provided with an expander 20 for causing the expansion of the vertical wall 21 of the rim into engagement with the inner edges of the beads 23 and 24 of a tire 25 which is to be aligned on the tire aligner 10.

The expander 20 is constituted, in part, by a toggle joint 27 which includes a first toggle link 28 and a second toggle link 29. The first toggle link 28 has one end pivotally connected, by means of an adjustable connection 31, to a clevis 32 provided on the vertical wall 21 of the rim 14. The first toggle link 28 is pivotally connected at its opposite end to the second toggle link 29 and has integrally formed therewith an actuating handle 34 which embodies an abutment 35 for engaging the upper edge of the second toggle link 29, as best shown in Fig. 3 of the drawing, to prevent the toggle joint 27 from being urged downwardly beyond a predetermined position.

The opposite end of the second toggle link 29 is pivotally connected to a clevis fitting 37 which has two lobes in which are pivotally secured the inner ends of expander links 40 and 41 whose outer ends are pivotally secured in clevises 42 and 43, respectively, mounted on the vertical wall 21 of the rim 14 on opposite sides of the slit in said rim. Formed integrally with the upper edge of the vertical wall 21 of the rim 14 is an annular flange 45 which is designed to engage the uppermost bead 23 of the tire 25 to prevent the dislodgement of said bead from the rim 14 and thus prevent the dislodgement of the tire 25 therefrom. The flange 45 thus constitutes a stop member for preventing the dislodgement of the bead and the tire 25 from the rim 14.

When the tire 25 is deposited upon the rim 14, the inner edges of the beads 23 and 24 of said tire do not necessarily engage the exterior of the vertical wall 21 of the rim 14 and it is necessary, during the subsequent actuation of the aligner 10, to expand the rim 14 by the use of the expander 20, and more particularly by the actuation of the toggle joint 27 to force the split edges of the rim 14 apart and urge the periphery of the vertical wall 21 of the rim 14 into contact with the inner edges of the beads 23 and 24 of the tire 25. However, it is a well known fact that the diameters of the beads of tires vary greatly even among tires presumably of the same size. Therefore, I have provided in the toggle joint on the end of the first toggle link 28 the adjustable connection 31 which, by means of the nut and bolt embodied therein, permits the toggle joint to be expanded or contracted so that the rim 14 can be correspondingly expanded or contracted by the energization of the toggle joint 27 to accommodate different tires having beads of different diameters. Mounted on the inner surface of the vertical wall 21 of the rim 14 is a plurality of spaced lugs 47 which are adapted to be engaged by the connection means 15, in a manner to be described in greater detail below.

Figure 3:
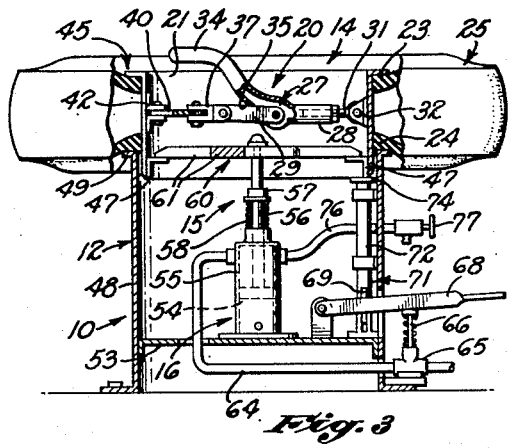
Fig. 3 is a view similar to Fig. 2 showing the tire in aligned position on the aligner.

The vertical wall 48 of the support 12 terminates at its upper edge in a radially extending, integral flange 49 which, as best shown in Figs. 2 and 3 of the drawing, is adapted to engage the outer lateral edge of the lowermost bead 24 of the tire 25 and, thus, to support the tire 25 and the rim 14 positioned therein on the support 12. However, prior to the disposition of the rim 14 in the tire 25 an air bag 51, which is utilized to force the tire into contact with the walls of a mold in which it is deposited, is disposed in the interior of the tire, as best shown in Fig. 2 of the drawing.

Supported upon a transverse partition 53 which spans the interior of the support 12 is the motor 16 which is constituted by a cylinder 55 having a piston 54 deposited therein. A piston rod 56 secured to the piston 54 constitutes a portion of the connection means 15 and has mounted on its periphery intermediate its ends a collar 57 which provides a seat for the upper end of a spring 58, of the compression type, whose lower end is seated upon the upper end of the cylinder 55. Therefore, the spring 58 normally urges the piston rod 56 and its associated piston 54 in an upward direction.

Mounted for rotation on the upper end of the piston rod 56 is a connector element 60 which is provided with a plurality of radiating arms 61. When the rim 14 is deposited on the support 12 together with the tire 25, the connector element 60 is rotated so that the radiating arms 61 do not impede the downward movement of the lugs 47 on the interior surface of the vertical wall 21 of the rim 14. After the rim has been placed in the position which is shown in Fig. 2 of the drawing, the connector element 60 is rotated so that the ends of the radiating arms 61 thereof overlie the lugs 47 on the rim 14, as best shown in Fig. 1 of the drawing.

The upper end of the cylinder 55 is connected by means of a line 64 to a source of air under pressure, the flow of pressurized air into the upper end of the cylinder 55 being controlled by a valve 65 in the line 64. The valve 65 includes a spring biased plunger 66 which is urged downwardly by the energization of a pedal 68 to permit pressurized air to flow into the upper end of the cylinder 55 to cause the downward movement therein of the piston 54 and the concomitant downward movement of the piston rod 56.

Figure 4:
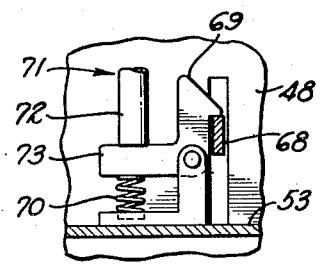
Fig. 4 is an enlarged, fragmentary view, taken on the line 4—4 of Fig. 2, of a portion of the latch and automatic de-energization means of the tire tread aligner of my invention.

Associated with the shank of the pedal 68 is a latch 69 which is biased into operative position by a compression spring 70, as best shown in Fig. 4 of the drawing. Operatively associated with the latch 69 is an automatic valve de-energizing means 71 constituted by an elongated rod 72, the lowermost end of which is engageable with an arm 73 of the latch 69 and the uppermost end 74 of which is engageable by the lower edge of the vertical wall 21 of the rim 14, as best shown in Fig. 3 of the drawing. The rod 72 is reciprocable in collars mounted on the interior of the vertical wall 48 of the support 12 and engagement of the lower edge of the vertical wall 21 of the rim 14 with the upper end 74 of the rod 72 causes the downward movement thereof with the consequent rotation of the latch 69 and the release of the shank of the lever 68 to cause the valve 65 to be closed by the upward movement of the plunger 66 to lock the pressurized air in the cylinder 55 above the piston 54.

The mode of utilization of the tire aligner 10 of my invention is as follows:

The rim 14 of the aligner 10 can be inserted in the opening in the tire 25 after the air bag 51 has been deposited in the tire 25 with the tire 25 on the floor or positioned on the radial flange 49 of the support 12. The radial arms 61 of the connector member 60 are then rotated, after the rim 14 has been properly disposed in the tire 25 and on the support 12, until the ends of the radiating arms 61 lie above the lugs 47 on the rim 14, as best shown in Figs. 1 and 2 of the drawing. The pedal 68 is then depressed to open the valve 65 and cause the flow of compressed air into the upper end of the cylinder 55 which urges the piston 54 downwardly, causing the concomitant downward movement of the piston rod 56 against the upward bias of the spring 58 and carrying the connector member 60 on the upper end of the piston rod 56 downwardly. The downward movement of the connector member 60 causes the outer ends of the radial arms 61 thereof to impinge upon the lugs 47 on the rim 14 and continued downward movement of the piston rod 56 causes relative axial movement between the rim 14 and the support 12 compressing the beads 23 and 24 of the tire 25 toward each other between the radial flange 45 of the rim 14 and the radial flange 49 on the support 12, as best shown in Fig. 3 of the drawing.

After the beads 23 and 24 of the tire 25 have been compressed toward each other to a predetermined position, the lowermost edge of the rim 14 engages the upper end 74 of the release rod 72 causing the latch 69 on the pedal 68 to be released and permitting the upward movement of the plunger 66 to close the valve 65 and lock the compressed air in the upper end of the cylinder 55 immobilizing the piston 54 therein and preventing further movement of the piston rod 56 associated therewith.

When the piston rod 56 is locked against movement in the above described manner, the ends of the radiating arms 61 of the connector member 60 hold the rim 14 against movement to maintain the beads 23 and 24 of the tire 25 in compressed condition. At this time, the handle 34 of the toggle joint 27 is moved downwardly into the position shown in Fig. 3 of the drawing to cause the expansion of the links 40 and 41 and the concomitant expansion of the periphery of the vertical wall 21 of the rim 14 into contact with the inner edges of the beads 23 and 24 of the tire 25, as shown in Fig. 3 of the drawing also. When this action is accomplished, the tire beads 23 and 24 are locked in vertical alignment with each other and the tread of the tire is accurately positioned since the accurate positioning of the beads 23 and 24 causes the accurate alignment of the tread of the tire 25.

A release valve 77 is then opened and the air expelled from the upper end of the cylinder 55 by the upward bias of the spring 58 which also causes the upward movement of the piston 54 and the concomitant upward movement of the piston rod 56 and the rotatable connector member 60 mounted thereupon, releasing the ends of the radiating arms 61 of the rotatable member 60 from engagement with the lugs 47 on the rim 14.

Figure 5:
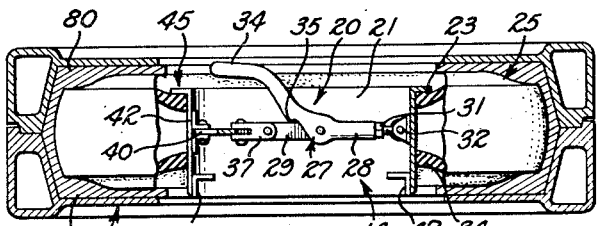
Fig. 5 is a partly sectional view showing an aligned tire and the rim of the aligner of my invention disposed in a clamshell type recapping mold.

The connector member 60 is then rotated so that the radial arms 61 are disposed in positions which will not obstruct the upward movement of the lugs 47 so that the rim 14 can be lifted upwardly and released from engagement with the connector member 60. The tire 25 is then deposited in the lower half 78 of a clamshell mold 79 and the upper half 80 thereof is subsequently closed thereupon, as shown in Fig. 5 of the drawing. After the mold 79 is closed upon the tire 25, and the air bag 51 inflated inside the tire 25 to seat the tire in the mold, the handle 34 of the toggle joint 27 can be pulled upwardly to release the rim 14 from engagement with the inner edges of the beads 23 and 24 of the tire 25 and can be returned to the support 12 for use with another tire. Therefore, the rim 14 serves to dispose the tire in proper orientation within the mold 79 and may be released subsequently to the closure of the mold upon the tire 25.

Figure 6:
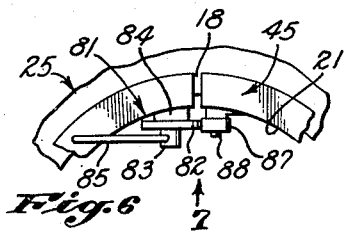
Fig. 6 is a fragmentary, plan view of an alternative expander construction for the rim of the aligner of my invention.
Figure 7:
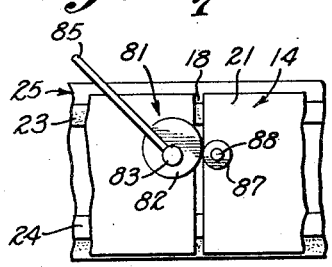
Fig. 7 is a fragmentary elevational view taken in the direction of the arrow 7 of Fig. 6.

Shown in Figs. 6 and 7 of the drawing is an alternative embodiment 81 of the expander utilized in conjunction with the rim 14. The expander 81 is constituted, in part, by a rotatable cam disc 82 which is mounted on a pin 83 journaled in a boss 84 formed in the side wall 21 of the rim 14 adjacent the split in the rim. Fixed in the pin 83 is a lever 85, the movement of which causes concomitant movement of the pin 83 and the cam disc affixed thereto. Juxtaposed to the cam disc 82 and adapted to be engaged thereby is a follower wheel 87 mounted for rotation on a pin 88 secured to the vertical wall 21 of the rim 14. When it is desired to expand the rim 14, the cam disc 82 is rotated by the concomitant rotation of the lever 85 to urge the follower wheel 87 to the right, as seen in Fig. 7 of the drawing.

I thus provide by my invention a tire tread aligner which is characterized by extreme simplicity of construction and ease of operation, which can be utilized with tires having beads of different diameters and which insures the exact alignment of the tread of the tire with the side walls thereof.

I claim as my invention:

1. A tire tread aligner, adapted to properly position the beads of a tire in parallel relationship to each other, and to hold them in that relationship while a retread is applied to the tire, comprising: a cylindrical split rim having a first annular flange on its upper end extending outwardly therefrom, said rim fitting very loosely inside the tire when the rim is not expanded; means for expanding said rim sufficiently to cause the beads to tightly and frictionally grip said rim; a support having a cylindrical opening of sufficient size to receive said rim when it is expanded, said support also having a second annular flange extending outwardly from the upper end thereof; and means for pulling said rim downwardly in said opening into a position in which the beads of the tire mounted on said rim are properly aligned between said first and second flanges.

2. A tire tread aligner, adapted to properly position the beads of a tire in parallel relationship to each other, and to hold them in that relationship while a retread is applied to the tire, comprising: a cylindrical split rim having a first annular flange on its upper end extending outwardly therefrom, said rim fitting very loosely inside the tire when the rim is not expanded; means for expanding said rim sufficiently to cause the beads to tightly and frictionally grip said rim; a support having a cylindrical opening of sufficient size to receive said rim when it is expanded, said support also having a second annular flange extending outwardly from the upper end thereof; a cylinder mounted in said support below said second flange; a piston in said cylinder having a piston rod extending upwardly into an opening in said rim when said rim is in bead-aligning position; fluid means for exerting a controlled pressure on the upper side at said piston; and detachable connecting means through which a downward pressure from said piston rod may be exerted on said rim.

References Cited in the file of this patent

UNITED STATES PATENTS

| Number | Name | Date |
|---|---|---|
| 601,088 | Verel | Mar. 22, 1898 |
| 1,352,722 | Caldwell | Sept. 14, 1920 |
| 1,429,733 | Harris | Sept. 19, 1922 |
| 1,449,268 | Conley | Mar. 20, 1923 |
| 1,528,750 | Bazarek | Mar. 10, 1925 |
| 1,724,813 | Weaver et al. | Aug. 13, 1929 |
| 2,065,644 | Bristol | Dec. 29, 1936 |
| 2,115,349 | Taylor | Apr. 26, 1938 |
| 2,128,417 | Kerr | Aug. 30, 1938 |
| 2,198,493 | Freeman | Apr. 23, 1940 |
| 2,301,958 | Lannen | Nov. 17, 1942 |
| 2,308,602 | Glynn | Jan. 19, 1943 |
| 2,469,723 | Greene | May 10, 1949 |
| 2,473,571 | Cook | June 21, 1949 |
| 2,480,578 | Hodges | Aug. 30, 1949 |
| 2,482,072 | Soderquist | Sept. 13, 1949 |
| 2,615,506 | Wilson | Oct. 28, 1952 |